United States Patent [19]

Ohtani et al.

[11] Patent Number: 4,973,624
[45] Date of Patent: Nov. 27, 1990

[54] COATING RESIN COMPOSITION

[75] Inventors: Eiichi Ohtani, Kyoto; Masayuki Mogami, Hitachi; Kengo Kobayashi, Hitachi; Shigeyoshi Tanaka, Hitachi, all of Japan

[73] Assignee: Hitachi Chemical Company, Ltd., Tokyo, Japan

[21] Appl. No.: 315,143

[22] Filed: Feb. 24, 1989

Related U.S. Application Data

[63] Continuation of Ser. No. 555,974, Nov. 29, 1983, abandoned.

[51] Int. Cl.$^5$ .................. C08L 67/08; C08L 63/00
[52] U.S. Cl. .................... 525/7.1; 525/7.4; 525/31
[58] Field of Search .................. 525/31, 7.4, 7.1

[56] References Cited

U.S. PATENT DOCUMENTS 2,939,854  6/1960  Christenson .................. 525/7.1
3,455,858  7/1969  Taft .................. 525/31

Primary Examiner—Patricia Short
Attorney, Agent, or Firm—Antonelli, Terry, Stout & Kraus

[57] ABSTRACT

A resin composition for coating comprising (A) a polyester-modified vinyl copolymer obtained by copolymerization of (a) a polyester resin having 5 to 60% by weight of oil or fatty acid component with special physical limitations, (b) a polymerizable unsaturated monomer having at least one tertiary amino group, (c) a polymerizable unsaturated monomer having at least one carboxyl group, and (d) an unsaturated monomer copolymerizable with the components (b) or (c), and (B) an epoxy resin can be cured at room temperature or with slight heating to give a coating film excellent in dispersibility of pigment having large oil absorption.

11 Claims, No Drawings

COATING RESIN COMPOSITION

This is a continuation of application Ser. No. 555,974, filed Nov. 29, 1983, now abandoned.

BACKGROUND OF THE INVENTION

This invention relates to a coating resin composition curable at low temperatures and normal temperatures. More particularly, this invention relates to a coating resin composition wherein curing reaction is accelerated by adding a metal drier thereto and having excellent performance in pigment dispersibility.

Recently, paints and varnishes capable of being dried and cured at low temperatures and containing no toxic isocyanate compound, or even contained in a very small amount, have been demanded in paint and varnish industry from the viewpoints of low environmental pollution and energy saving.

In the applications of paints and varnishes not capable of treating at high temperatures such as for repairing cars, for woodworking, for plastics, for building materials such as concrete, etc., there have been used acrylic lacquer compositions added with pyroxylin, acrylic urethane coating compositions, phthalic enamel coating compositions, etc. The lacquer compositions have their limit in coating performance since no crosslinking takes place; the urethane coating compositions have problems in the production cost and workability since there are used isocyanate compounds which are expensive and have a problem in toxicity; and the phthalic enamel coating compositions have problems in coating performance such as hardness of coating film, etc.

In order to solve such problems, it is proposed a process wherein a compound having basic nitrogens and/or carboxyl groups is cured by an epoxy compound. As the compound having basic nitrogens and carboxyl groups, there have been proposed vinyl copolymers having basic nitrogens and carboxyl groups at side chains obtained by copolymerization of one or more unsaturated monomers having a basic nitrogen and one or more unsaturated monomers having a carboxyl group. But these vinyl copolymers are poor in compatibility with pigments having large oil absorption compared with conventional polyester resins due to their molecular structures. Particularly when these vinyl copolymers are used in coating compositions containing carbon black, there take place pigment separation or segregation and lowering in luster of coating film; which presents a problem in practical use.

SUMMARY OF THE INVENTION

This invention provides a resin composition solving the problems mentioned above and being capable of promoting a curing reaction when a metal drier is added.

In accordance with this invention, there is provided a resin composition for coating which comprises (A) a polyester-modified vinyl copolymer obtained by copolymerization of the components (b) to (d) in the presence of the component (a) wherein
  (a) 0.5 to 40 parts by weight of a polyester resin having 5 to 60% by weight of oil or fatty acid component, an iodine value of 0.2 to 200, a viscosity of 0.5 to 200 poises measured at 25° C. and an acid value of 0.5 to 20 at a solids content of 59 to 61% by weight diluted with xylol,
  (b) 1 to 30 parts by weight of a polymerizable unsaturated monomer having at least one tertiary amino group,
  (c) 1 to 30 parts by weight of a polymerizable unsaturated monomer having at least one carboxyl group, and
  (d) 0 to 97.5 parts by weight of an unsaturated monomer except for the components (b) and (c) and copolymerizable with the component (b) or (c), and (B) an epoxy resin.

DESCRIPTION OF PREFERRED EMBODIMENTS

The polyester resin of the component (a) should have the oil or fatty acid component in an amount of 5 to by weight. If the amount is less than 5% by weight, the pigment dispersibility becomes poor in the case of using pigments having large oil absorption (e.g., carbon black, etc.), while if the amount is more than 60% by weight, stain resistance, hardness and solvent resistance of coating film are lowered.

The polyester resin of the component (a) should have an iodine value of 0.2 to 200. If the iodine value is less than 0.2, the degree of grafting of the components (b) to (d) to the polyester resin is lowered, the resulting coating film is whitened, or solvent resistance and chemical resistance of coating film after drying are lowered. On the other hand, if the iodine value is more than 200, the degree of grafting of the components (b) to (d) to the polyester resin becomes too large to bring about gelation easily at the production of the polyester-modified vinyl copolymer.

The polyester resin of the component (a) should have a viscosity of 0.5 to 200 poises measured at 25° C. and an acid value of 0.5 to 20, at a solids content of 59 to 61% by weight diluted with xylol. If the viscosity is less than 0.5 poise, the molecular weight of the polyester resin becomes smaller so as to lessen solvent resistance and stain resistance of the resulting coating film, while if the viscosity is more than 200, there easily takes place gelation at the production of the polyester-modified vinyl copolymer (A). On the other hand, if the acid value is less than 0.5, there easily takes place gelation at the synthesis of the polyester resin, while if the acid value is more than 20, the molecular weight of the polyester resin generally becomes too small to lower water resistance and adhesiveness of the resulting coating film.

The polyester resin can be produced by using starting materials such as unsaturated dicarboxylic acids or anhydrides thereof, e.g., maleic acid, fumaric acid, itaconic acid, etc.; drying oils, e.g., safflower oil, soybean oil, linseed oil, tall oil, dehydrated castor oil, tung oil, etc.; non-drying oils, e.g., coconut oil, castor oil, etc.; or fatty acids of these oils; polyhydric alcohols, e.g., ethylene glycol, diethylene glycol, propylene glycol, dipropylene glycol, neopentyl glycol, 1,6-hexanediol, glycerin, trimethylolpropane, trimethylolethane, pentaerythitol, dipentaerythrithol, etc.; saturated polybasic acids and their anhydrides, e.g., phthalic acid, isophthalic acid, terephthalic acid, tetrahydrophthalic anhydride, trimellitic acid, etc.; monobasic acids, e.g. benzoic acid, etc. These starting materials can be used in the form of derivatives thereof capable of forming esters. It is also possible to use as the component (a) reaction products obtained by reacting the polyester resin prepared by using these starting materials with one or more unsaturated monomers having a glycidyl group such as glycidyl ester of methacrylic acid, glycidiyl ester of acrylic acid, glycidyl allyl ether, etc. In addition, it is also possible to use di- or monoallyl ether of trimethylolpropane as a starting material of the polyester resin.

The polyester resin of the component (a) can be produced by a conventional process and there is no particular limitation thereto. For example, there can be employed the so-called ester interchange method, the so-called fatty acid method, etc. More concretely, in the case of the ester interchange method, the polyester resin can be produced by reacting an oil with a polyhydric alcohol in an equivalent amount or more in the presence of an ester interchange catalyst such as lithium hydroxide, lithium naphthenate, lead oxide, or the like at 200° to 260° C., conducting half-esterification at about 180° C. by adding one or more polybasic acids or anhydrides thereof, residual amount of the polyhydric alcohol, and other components if required, to the reaction system, and continuing the reaction to the end point at 200° to 240° C. In the case of the fatty acid method, the polyester resin can be produced by reacting one or more oils, polyhydric alcohols polybasic acids and other components if required at about 180° C., followed by the reaction at 200° to 240° C. to the end point.

The amount of the component (a) to be used is 0.5 to 40 parts by weight. If the amount is too small, there is a tendency to lower the pigment dispersibility, while if the amount is too large, there is a tendency to lower weather resistance of the resulting coating film.

As the component (b), the polymerizable unsaturated monomer having at least one tertiary amino group, there can be used N,N-dimethylaminoethyl methacrylate, N,N-diethylaminoethyl methacrylate, vinylpyridine, vinylpyrroline, vinylquinoline, vinylisoquinoline, N,N-dimethylaminoethyl vinyl ether, 2-(N,N-dimethylamino)-4-vinylpyrimidine, trans-1,2-dipyridylethylene, 2-methyl-5vinylpyridine, 3-cinnamoylpyridine1 4,6-diamino-2-vinyl-5-triazine, etc. These compounds can be used alone or as a mixture thereof.

The amount of the component (b) to be used is to 30 parts by weight. If the amount of the component (b) is too small, curing properties become insufficient, while if the amount is too large, water resistance and chemical resistance of the resulting coating film are undesirably lowered.

As the component (c), the polymerizable unsaturated monomer having at least one carboxyl group, there can be used acrylic acid, methacrylic acid, maleic acid, fumaric acid, itaconic acid, etc. These carboxylic acids can be used alone or as a mixture thereof.

The amount of the component (c) to be used is 1 to 30 parts by weight. If the amount of the component (c) is too small, curing properties becomes insufficient, while if the amount is too large, the viscosity of the polyester-modified vinyl copolymer (A) increases to lower workability. The use of the component (c) in an amount of 1 to 10 parts by weight is preferable.

The component (d) which is an unsaturated monomer except for the components (b) and (c) and copolymerizable with the component (b) or (c) can be selected from two groups of compounds.

A first group of the component (d) includes unsaturated monomers having no reactive functional group other than polymerizable double bond. Examples of such unsaturated monomers are styrene series monomers such as styrene, vinyltoluene, α-chlorostyrene, etc.; alkyl acrylates such as ethyl acrylate, n-butyl acrylate, isobutyl acrylate, 2-ethylhexyl acrylate, lauryl acrylate, etc., alkyl methacrylates such as methyl methacrylate, ethyl methacrylate, n-butyl methacrylate, isobutyl methacrylate, 2-ethylhexyl methacrylate, lauryl methacrylate, etc.; vinyl esters of saturated monobasic acids such as vinyl acetate, vinyl propionate, vinyl stearate, etc.; linear or alicyclic monoolefins such as ethylene, propylene, butene, pentene, cyclopentene, cyclohexene, cyclooctene, etc.; vinyl ethers such as methyl vinyl ether, ethyl vinyl ether, isobutyl vinyl ether, octyl vinyl ether, lauryl vinyl ether, phenyl vinyl ether, etc.; halogen-containing unsaturated monomers such as vinyl chloride, vinylidene chloride, trichloroethylene, chlorophenyl vinyl ether, etc.; vinyl cyanides such as acrylonitrile, methacrylonitrile, etc. These unsaturated monomers can be use alone or as a mixture thereof. Among them, the styrene series monomers, the alkyl acrylates and alkyl methacrylates are particularly preferable.

A second group of the component (d) includes unsaturated monomers having one or more functional groups and dicyclopentadiene derivatives. Examples of such unsaturated monomers are hydroxyalkyl acrylates such as 2-hydroxyethyl acrylate, 2-hydroxypropyl acrylate, etc.; hydroxyalkyl methacrylates such as 2-hydroxyethyl methacrylate, 2-hydroxypropyl methacrylate, etc.; allyl alcohol; phosphoric acid group-containing unsaturated monomers such as phosphoric ethylene acrylate, phosphoric trimethylene acrylate, phospholic ethylene methacrylate, phosphoric trimethylene methacrylate, phosphoric 1-chloromethylethylene methacrylate, etc.; unsaturated monomers having an amido group such as acrylamide, metharylamide, N-methylolacrylamide, N-methylolmethacrylamide, etc.; and dicyclopentadiene derivatives represented by the formula:

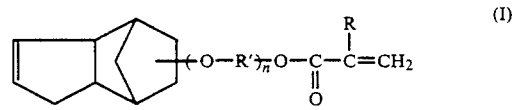

wherein R is hydrogen, halogen or a lower alkyl group; R' is a divalent organic group; and n is zero or 1. These unsaturated monomers can be used alone or as a mixture thereof. In the formula (I), R' is a divalent organic group having preferably 1 to 18 carbon atoms, more preferably 2 to 12 carbon atoms. R' is preferably an alkylene group or a group of the formula: $-R''-O_mR'''-$, wherein $R''$ and $R'''$ are independently the same or different alkylene groups having 2 or more carbon atoms; and m is an integer of 1 or more. Examples of the dicyclopentadiene derivatives represented by the formula (I) are dicyclopentenyl acrylate, dicyclopentenyloxyethyl acrylate, dicyclopentenyl methacrylate, dicyclopentenyloxyethyl methacrylate, acrylic or methacrylic acid ester of diethylene glycol dicyclopentenyl monoether, etc.

The unsaturated monomer belonging to the second group of the component (d) can be used in an amount of preferably 0 to 30% by weight, more preferably 0 to 10% by weight based on the total weight of the components (a), (b), (c) and (d). When the amount of the unsaturated monomer belonging to the second group is more than 30% by weight, there is a tendency to lower chemical resistance of the resulting coating film.

The polyester-modified vinyl copolymer (A) can be produced by a conventional process such as a solution polymerization method, a bulk polymerization method, or the like. In the case of the solution polymerization, there can be employed a process wherein the component (a) and a solvent are placed in a reactor and the reaction is carried out at 60° to 160° C. by adding uniformly dropwise the components (b) to (d) together with a polymerization catalyst for 1 to 6 hours. As the polymerization catalyst, there can be used a peroxide such as benzoyl peroxide, t-butyl hydroperoxide, or the like, an azobis series catalyst such as azobisisobutyronitrile, or the like. Further, a part of the components (b) to (d) can be charged into the reactor previously together with the component (a) and the polymer. As the solvent, there can be used toluene, xylene, butanol, isopropanol, methyl isobutyl ketone, butyl acetate, butyl Cellosolve, etc.

The epoxy resin (B) usable in this invention is one or more epoxy compounds having two or more epoxy groups in one molecule, and may contain as a part thereof one or more epoxy compounds having only one epoxy group in one molecule Examples of the epoxy resin (B) are polyglycidyl ethers of aliphatic polyhydric alcohols such as glycerol diglycidyl ether, glycerol triglycidyl ether, trimethylolpropane diglycidyl ether, trimethylolpropane triglycidyl ether, pentarythritol diglycidyl ether, pentaerythritol triglycidyl ether, diglycerol glycidyl ether, sorbitol tetraglycidyl ether, etc.; polyglycidyl ethers of polyhydric phenols such as bisphenol type glycidyl ethers obtained by reacting bisphenol A with epichlorohydrin, phenol novolak type polyglycidyl ethers, etc.; polyglycidyl esters of aromatic polybasic acids such as diglycidyl ester of phthalic acid, etc.; alicyclic polyepoxy compounds; copolymers of glycidyl group-containing unsaturated monomers such as glycidyl ester of acrylic acid, glycidyl ester of methacrylic acid, etc. The epoxy resin (B) may contain one or more compounds having only one epoxy group in one molecule in an amount of 10% by weight or less, preferably 5% by weight or less.

It is preferable to compound the polyester-modified vinyl copolymer (A) and the epoxy resin (B) so as to make the total of the tertiary amino group and the carboxyl group of the component (A) 0.5 to 2 equivalents per equivalent of the epoxy group of the component (B). When the amount is more than 2 equivalents, curing becomes difficult, while when the amount is less than 0.5 equivalent, coating film properties are lowered due to a large number of remaining unreacted epoxy groups.

Further it is preferable to admix the polyester-modified vinyl copolymer (A) and the epoxy resin (B) at the time of use to make a resin composition. When the components (A) and (B) are admixed previously, there is a tendency to bring about curing during storage.

The resin composition of this invention can be used as a clear lacquer. When the resin composition of this invention is used as enamel coating by adding one or more pigments such as carbon black, etc., additives, solvents, etc., it is preferable to add the pigments, additives and solvents to the polyester-modified vinyl copolymer (A) previously to form a uniform mixture, followed by mixing with the epoxy resin (B). When carbon black is used, it is preferable to use it in an amount of 0.1 to 30% by weight based on the total weight of the components (A) and (B).

The resin composition of this invention may contain a metal drier. Examples of the metal drier are lead naphthenate, zinc naphthenate, cobalt naphthenate, zirconium naphthenate, lead octoate, zinc octoate, cobalt octoate, zirconium octoate, etc. The metal drier is preferably used in an amount of 0.01 to 1% by weight (as metal weight) based on the weight of the polyester-modified vinyl copolymer (A). The metal drier can be added previously to the polyester-modified vinyl copolymer (A), but can preferably be added at the time of mixing the polyester-modified vinyl copolymer (A) with the epoxy resin (B).

This invention is illustrated by way of the following Examples, in which all parts and percents are by weight, unless otherwise specified.

EXAMPLE 1

In a 2-liter four-necked flask, 96 parts of coconut oil fatty acid, 158 parts of trimethylolpropane, 311 parts of 1,6-hexanediol and 523 parts of isophthalic acid were placed and reacted at 180° C. for 2 hours and at 190° C. for 2 hours while passing an inert gas through the flask. The temperature was raised to 210° C. to proceed the esterification. When the acid value reached 25 to 30, the flask was cooled to 80° C. After adding 40 parts of maleic anhydride, the temperature was raised again to 180° C. When the acid value reached 10 to 15, the reaction was stopped. The resulting polyester resin had an iodine value of 10, a viscosity of 7.5 poises (at 25° C.) and an acid value of 7.3 when diluted to a solids content of 60% with xylene. The polyester resin thus obtained was diluted with a mixed solvent of xylene and n-butanol (80 : 20 by weight) to a solids content of 60%. In the presence of 150 parts of the thus obtained polyester resin solution (I) (solids content 60%), a mixture of 100 parts of N,N-dimethylaminoethyl methacrylate, 50 parts of methacrylic acid, 360 parts of butyl acrylate and 400 parts of methyl methacrylate was solution polymerized in 940 parts of toluene as solvent at 100° C. using 15 parts of azobisisobutyronitrile as polymerization initiator to give a polyester-modified vinyl copolymer solution (II).

To 100 part (as solid) of the polyester-modified vinyl copolymer solution (II), 3 parts of carbon black was added and kneaded twice by using a three-roll mill, followed by dilution with a mixed solvent of toluene : butyl acetate : Cellosolve acetate (50 : 40 : 10 by weight) to give a resin solution having a solids content of 25%. When the resulting resin solution was flow coated on a glass plate, carbon black was uniformly dispersed by observation with the naked eyes.

To 100 parts (as solid) of the polyester-modified vinyl copolymer solution (II), 8 parts of sorbitol polyglycidyl ether (main component: sorbitol tetraglycidyl ether, epoxy equivalent weight 170) was added and mixed to give a coating composition (III). Immediately after the mixing, the coating composition (III) was coated on a soft steel plate treated with bondenite #144 to give a film thickness of 30 μm, followed by baking at 80° C. for 30 minutes. The resulting coating film had a pencil hardness of 2H. When dried at room temperature for 2 days, the resulting coating film had a pencil hardness of H.

On the other hand, to 108 parts (as solid) of the coating composition (III), 0.02 part of cobalt naphthenate and 0.3 part of lead naphthenate were added as metal drier immediately after the preparation of the coating composition (III) to give a coating composition (IV). Immediately after the addition of the metal driers, the same test as mentioned above was conducted to give the pencil hardness of 2H after baking at 80° C. for 20 minutes and the pencil hardness of H after drying at room temperature for 1 day.

When the coating compositions (III) and (IV) were placed in beakers separately and allowed to stand at room temperature, gelation took place in the beaker containing the coating composition (III) after 1 day and gelation took place in the beaker containing the composition (IV) after a half day. (The term "gelation" means that no fluidity is admitted even when a beaker is declined to an angle of 90° C.) Thus, the addition of metal drier influenced the curing properties.

EXAMPLE 2

A mixture of 200 parts of the polyester resin solution (I) obtained in Example 1, 50 parts of N,N-dimethylaminoethyl methacrylate, 30 parts of methacrylic acid, 300 parts of methyl methacrylate, 200 parts of styrene, 100 parts of dicyclopentenyloxyethyl acrylate and 200 parts of butyl acrylate was solution polymerized using 880 parts of toluene as solvent and 20 parts of azobisisobutyronitrile as polymerization initiator at 100° C. to give a polyester-modified vinyl copolymer solution (V).

Using the polyester-modified vinyl copolymer solution (V), dispersibility of carbon black was tested in the same manner as described in Example 1. The carbon black was dispersed uniformly.

To 100 parts (as solid) of the polyester-modified vinyl copolymer solution (V), 5 parts of sorbitol polyglycidyl ether (main component: sorbitol tetraglycidyl ether, epoxy equivalent weight 170) was added and mixed to give a coating composition (VI). Further, 0.02 part of cobalt naphthenate and 0.3 part of lead naphthenate as metal drier were added to 105 parts (as solid) of the coating composition (VI) to give a coating composition (VII). Coating films obtained by using the coating composition (VI) in the same manner as described in Example 1 had the pencil hardness of F after baked at 80° C. for 30 minutes and that of HB after dried at room temperature for 2 days. On the other hand, coating films obtained by using the coating composition (VII) in the same manner as described in Example 1 had the pencil hardness of F after baked at 80° C. for 20 minutes and that of HB after dried at room temperature for 1 day.

When the gelation was tested in the same manner as described in Example 1, the coating composition (VI) was gelled after 1 day and the coating composition (VII) was gelled after a half day. Thus, the addition of metal drier influenced the curing properties.

COMPARATIVE EXAMPLE 1

A mixture of 100 parts of N,N-dimethylaminoethyl methacrylate, 50 parts of methacrylic acid, 360 parts of butyl acrylate and 400 parts of methyl methacrylate was solution polymerized by using 910 parts of toluene as solvent and 15 parts of azobisisobutyronitrile as polymerization initiator at 100° C. to give a vinyl copolymer solution (VIII).

Using the vinyl copolymer solution (VIII), dispersibility of carbon black was tested in the same manner as described in Example 1. The carbon black was agglomerated and was not dispersed uniformly.

To 100 parts (as solid) of the vinyl copolymer solution (VIII), 10 parts of sorbitol polyglycidyl ether (epoxy equivalent weight 170) was added and mixed to give a coating composition (IX). Further, 0.02 part of cobalt naphthenate and 0.3 part of lead naphthenate as metal drier were added to 110 parts (as solid) of the coating composition (IX) to give a coating composition (X). When coating films were produced by using the coating compositions (IX) and (X) in the same manner as described in Example 1, no difference in curing properties was observed between the coating compositions (IX) and (X). There were obtained the pencil hardness of 3H after baked at 80° C. for 30 minutes and that of 2H after dried at room temperature for 2 days, by using individual coating compositions.

In the gelation test conducted in the same manner as described in Example 1, no effect of addition of metal drier was observed in the coating composition (X) compared with the coating composition (IX).

COMPARATIVE EXAMPLE 2

When only the polyester-modified vinyl copolymer solution (II) obtained in Example 1 was coated on a soft steel plate treated with bonderite #144 to give a film thickness of 30 μm, the pencil hardness of the resulting coating film was 4B either after baking at 80° C. for 30 minutes or after dried at room temperature for 2 days. The polyester-modified vinyl copolymer solution (II) was not gelled when allowed to stand at room temperature for 1 month.

As mentioned above, the coating composition of this invention can be cured at room temperature or with slight heating at low temperatures. Further, the addition of a metal drier can accelerate the curing reaction. In addition, there can be obtained a resin composition for coating excellent in dispersibility of pigments, particularly carbon black, with large oil absorption.

What is claimed is:
1. A resin composition for coating comprising
(A) a polyester-modified vinyl copolymer obtained by copolymerization of the components (b) to (d) in the presence of the component (a) wherein the components are as follows:
(a) 0.5 to 40 parts by weight of a polyester resin having 5% to 60% by weight of oil or fatty acid component, an iodine value of 0.2 to 200, a viscosity of 0.5 to 200 poises measured at 25° C. and an acid value of 0.5 to 20 at a solids content of 59 to 61% by weight diluted with xylol,
(b) 1 to 30 parts by weight of a polymerizable unsaturated monomer having at least one tertiary amino group,
(c) 1 to 30 parts by weight of a polymerizable unsaturated monomer having at lest one carboxyl group, and
(d) 0 to 97.5 parts by weight of an unsaturated monomer other than components (b) and (c) and copolymerizable with the component (b) or the component (c), and
(B) an epoxy resin.
2. A composition according to claim 1, wherein the amount of the component (A) is 0.5 to 2 equivalents in terms of the total of the tertiary amino group and the carboxyl group per equivalent of the epoxy group of the component (B).
3. A composition according to claim 1, wherein the polyester-modified vinyl copolymer (A) is obtained by solution or bulk polymerization of a mixture of the components (a) through (d).
4. A composition according to claim 1, wherein the component (b) is at least one member selected from the group consisting of N,N-dimethylaminoethyl methacrylate, N,N-diethylaminoethyl methacrylate, vinylpyridine, vinylpyrroline, vinylquinoline, vinylisoquinoline,

N,N-dimethylaminoethyl vinyl ether, 2-(N,N-dimethylamino)-4-vinylpyrimidine, trans-,2-dipyridylethylene, 2-methyl-5-vinylpyridine, 3-cinnamoylpyridine, and 4,6-diamino-2-vinyl-5-triazine.

5. A component according to claim 1, wherein the component (c) is at least one member selected from the group consisting of acrylic acid, methacrylic acid, maleic acid, fumaric acid and itaconic acid.

6. A composition according to claim 1, wherein the component (d) is at least one unsaturated monomer having no reactive functional group other than polymerizable double bond selected from the group consisting of styrene series monomer, alkyl acrylate, alkyl methacrylate, vinyl ester of saturated monobasic acid, linear or alicyclic monoolefin, vinyl ether, halogen-containing unsaturated monomer and vinyl cyanide.

7. A composition according to claim 1, which further comprises a metal drier.

8. A composition according to claim 7, wherein the metal drier is used in an amount of 0.01 to 1% by weight as metal weight based on the weight of the polyester-modified vinyl copolymer (A).

9. A composition according to claim 7, wherein the metal drier is at least one member selected from the group consisting of lead naphthenate, zinc naphthenate, cobalt naphthenate, zirconium naphthenate, lead octoate, zinc octoate, cobalt octoate, and zirconium octoate.

10. A composition according to claim 1, wherein the component (d) is methyl methacrylate.

11. A composition according to claim 1, wherein the component (d) is at least one member selected from the group consisting of a styrene series monomer, an alkyl acrylate and an alkyl methacrylate.

* * * * *